United States Patent
Sonego et al.

(10) Patent No.: US 11,382,454 B2
(45) Date of Patent: Jul. 12, 2022

(54) COMBINED APPARATUS FOR HEATING, COOKING, GRILLING AND DEFROSTING OF FOODS OF VARIOUS KIND

(71) Applicant: MARRONE s.r.l., Pordenone (IT)

(72) Inventors: Alessandro Sonego, Brugnera (IT); Armando Pujatti, Budoia (IT); Maurizio Fantin, Casarsa della Delizia (IT)

(73) Assignee: MARRONE s.r.l., Zoppola (IT)

( * ) Notice: Subject to any disclaimer, the term of this patent is extended or adjusted under 35 U.S.C. 154(b) by 41 days.

(21) Appl. No.: 16/961,001

(22) PCT Filed: Mar. 5, 2018

(86) PCT No.: PCT/IT2018/000033
§ 371 (c)(1),
(2) Date: Jul. 9, 2020

(87) PCT Pub. No.: WO2019/171404
PCT Pub. Date: Sep. 12, 2019

(65) Prior Publication Data
US 2020/0345175 A1 Nov. 5, 2020

(51) Int. Cl.
*H05B 6/64* (2006.01)
*A47J 37/06* (2006.01)
(Continued)

(52) U.S. Cl.
CPC ........... *A47J 37/0629* (2013.01); *A47J 36/32* (2013.01); *F16H 25/20* (2013.01); *F24C 7/067* (2013.01);
(Continued)

(58) Field of Classification Search
CPC .. A47J 37/049; A47J 37/0611; A47J 37/0629; A47J 37/0676; A47J 37/0713;
(Continued)

(56) References Cited

U.S. PATENT DOCUMENTS 3,878,350 A 4/1975 Takagi
8,530,797 B2 * 9/2013 Tassan-Mangina .......... A47J 37/0611
219/450.1
(Continued)

FOREIGN PATENT DOCUMENTS

| CN | 107157304 A | 9/2017 |
| FR | 1061267 A | 4/1954 |
| JP | 2014030462 A | 2/2014 |

OTHER PUBLICATIONS

International Search Report and Written Opinion dated Nov. 16, 2018 in corresponding International Application No. PCT/IT2018/000033, 11 pages.

*Primary Examiner* — Hung D Nguyen
(74) *Attorney, Agent, or Firm* — Maier & Maier, PLLC

(57) ABSTRACT

A combined apparatus for heating, cooking, grilling and defrosting of foods of various kinds, depending on the type of foods to be treated from time to time and the duration of the foods treatment foreseen by each user of the same apparatus, where each hot treatment of foods may be effected either by heating or by microwaves only, or by heating and microwaves combined to each other. There are described in detail all the technical characteristics of the apparatus and the relative control circuits either for heating or for generating the microwaves. Advantages include use of a sole and single apparatus for hot treating the foods for providing for the heating, the cooking, the grilling and the defrosting of the same foods, instead of employing as it happens hitherto of single separated apparatuses for performing the same functions.

12 Claims, 10 Drawing Sheets

(51) Int. Cl.
   *A47J 36/32*   (2006.01)
   *F16H 25/20*   (2006.01)
   *F24C 7/06*    (2006.01)
   *F24C 15/08*   (2006.01)
   *F24C 15/14*   (2006.01)
   *F24C 15/16*   (2006.01)
   *H05B 1/02*    (2006.01)
   *H05B 3/68*    (2006.01)
   *H05B 6/70*    (2006.01)

(52) U.S. Cl.
   CPC .............. *F24C 15/08* (2013.01); *F24C 15/14* (2013.01); *F24C 15/166* (2013.01); *H05B 1/0261* (2013.01); *H05B 3/68* (2013.01); *H05B 6/642* (2013.01); *H05B 6/647* (2013.01); *H05B 6/6464* (2013.01); *H05B 6/708* (2013.01); *H05B 2203/002* (2013.01)

(58) Field of Classification Search
   CPC ........ A47J 37/074; A47J 36/027; A47J 36/08; A47J 36/32; A47J 36/38; H05B 3/68; H05B 1/0261; H05B 6/6402; H05B 6/6408; H05B 6/6414; H05B 6/642; H05B 6/6426; H05B 6/6441; H05B 6/6447; H05B 6/6458; H05B 6/6464; H05B 6/645; H05B 6/647; H05B 6/6482; H05B 6/664; H05B 6/705; H05B 6/708; H05B 6/725; H05B 6/76; H05B 6/763; H05B 6/80; H05B 2203/002; F24C 15/08; F24C 15/14; F24C 15/166; F24C 7/067; F16H 25/20
   USPC ................ 219/678, 679, 680, 685, 756, 762
   See application file for complete search history.

(56) References Cited

U.S. PATENT DOCUMENTS

| | | | |
|---|---|---|---|
| 8,759,728 B2* | 6/2014 | Tassan-Mangina | H05B 6/6482 219/690 |
| 9,750,090 B2* | 8/2017 | Morassut | A23L 5/15 |
| 10,225,893 B2* | 3/2019 | Tippmann | H05B 6/80 |
| 10,412,787 B2* | 9/2019 | Lee | A47J 36/08 |
| 10,736,186 B2* | 8/2020 | An | H05B 6/763 |
| 2006/0289514 A1* | 12/2006 | Baumann | H05B 6/6482 219/729 |
| 2008/0099471 A1* | 5/2008 | Fadelli | H05B 6/6482 219/685 |
| 2015/0144619 A1* | 5/2015 | Simonato | A47J 37/0611 219/685 |
| 2015/0230295 A1* | 8/2015 | Morassut | A47J 37/0611 219/685 |

* cited by examiner

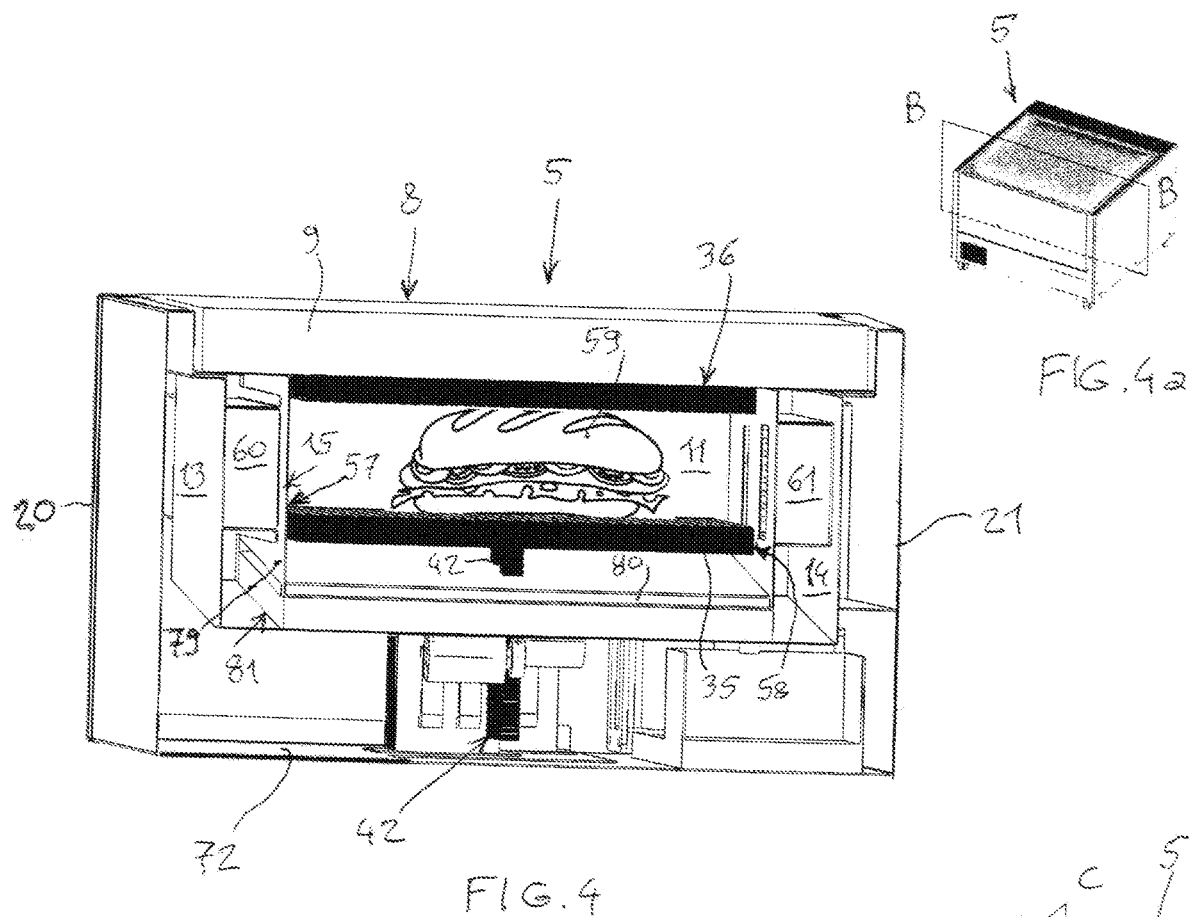
FIG.4
FIG.4a
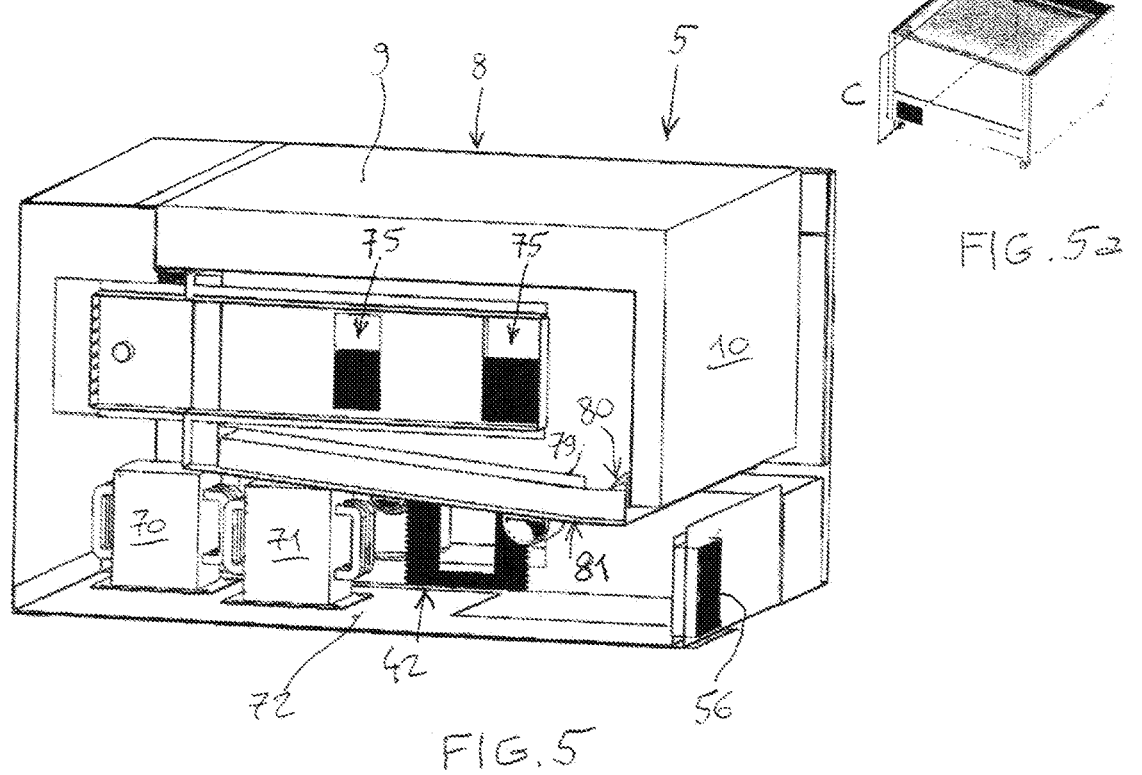
FIG.5
FIG.5a

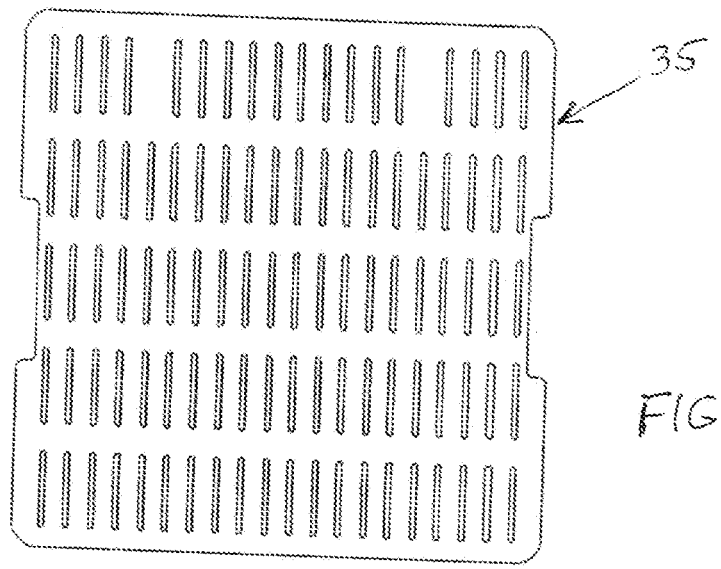
FIG. 10
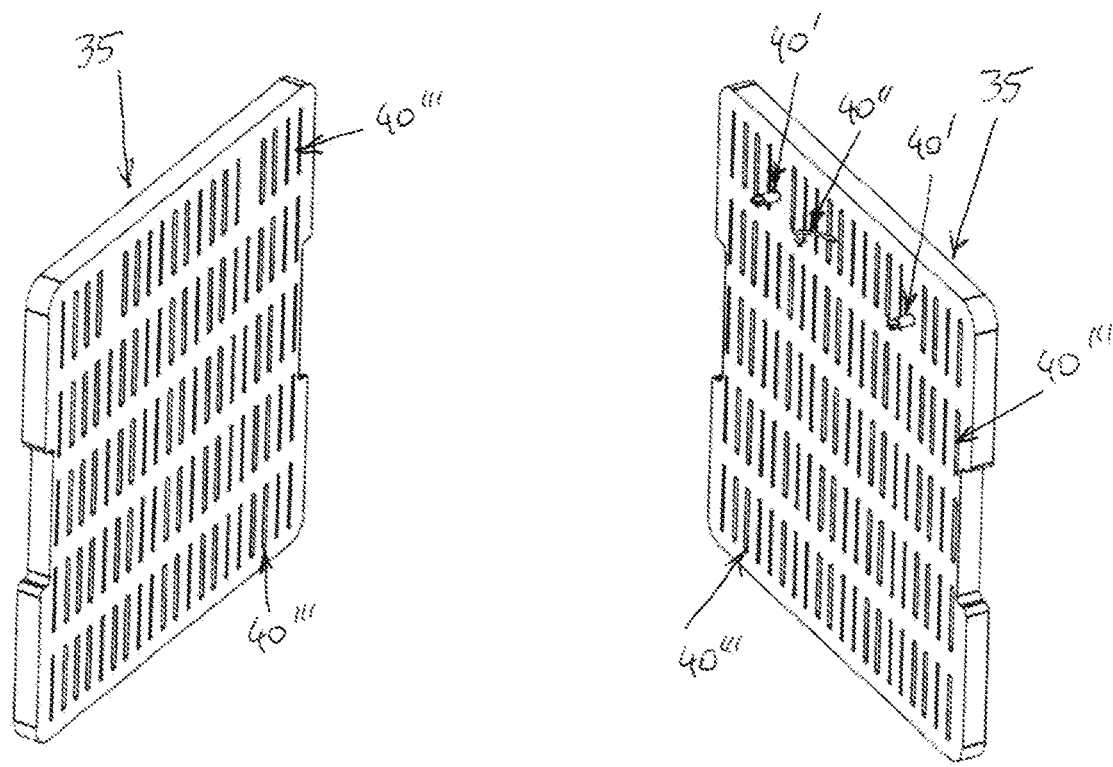
FIG. 11
FIG. 11a

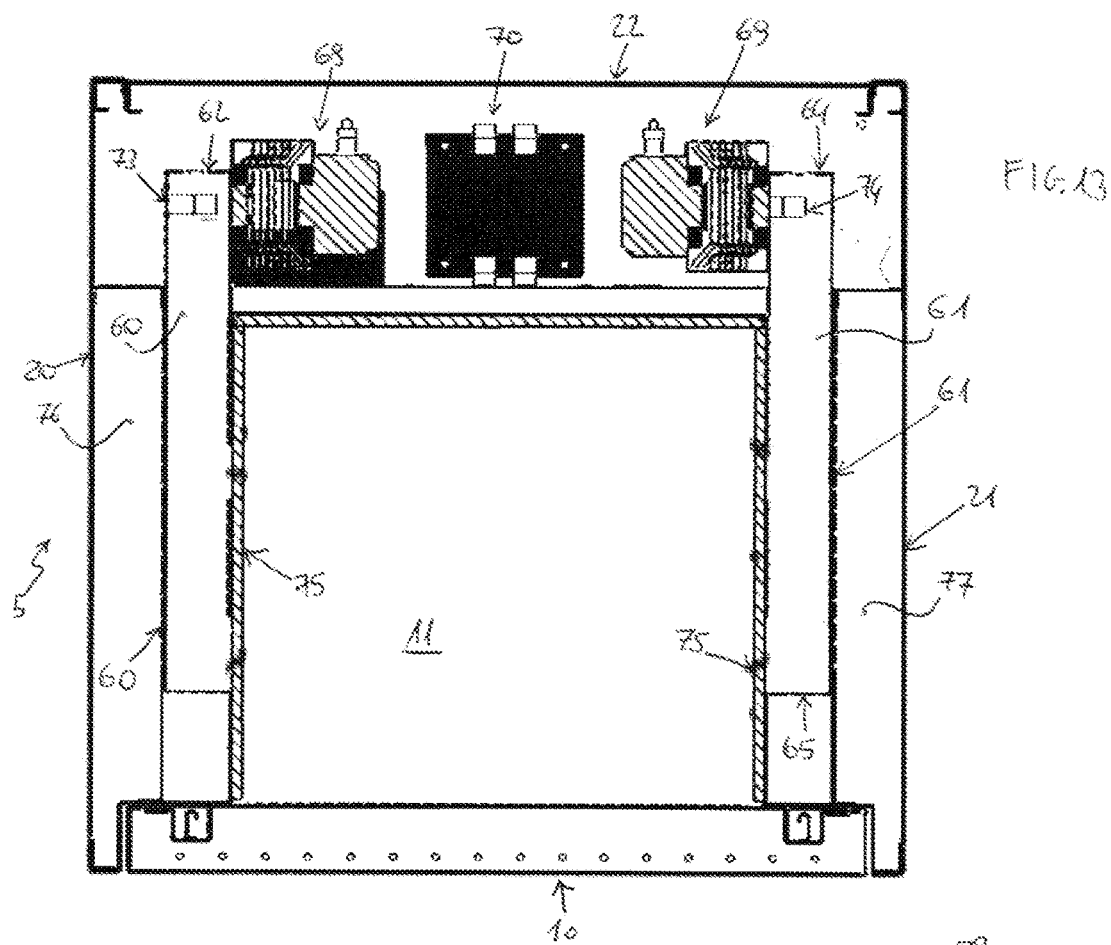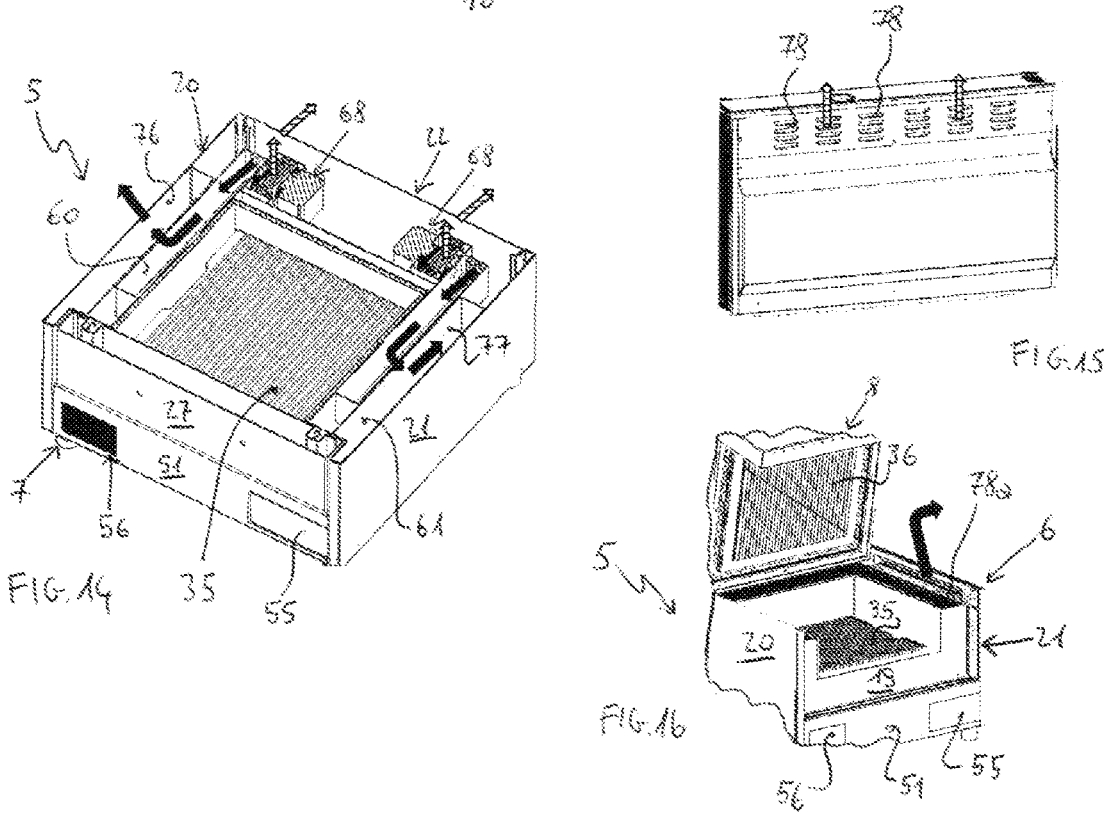

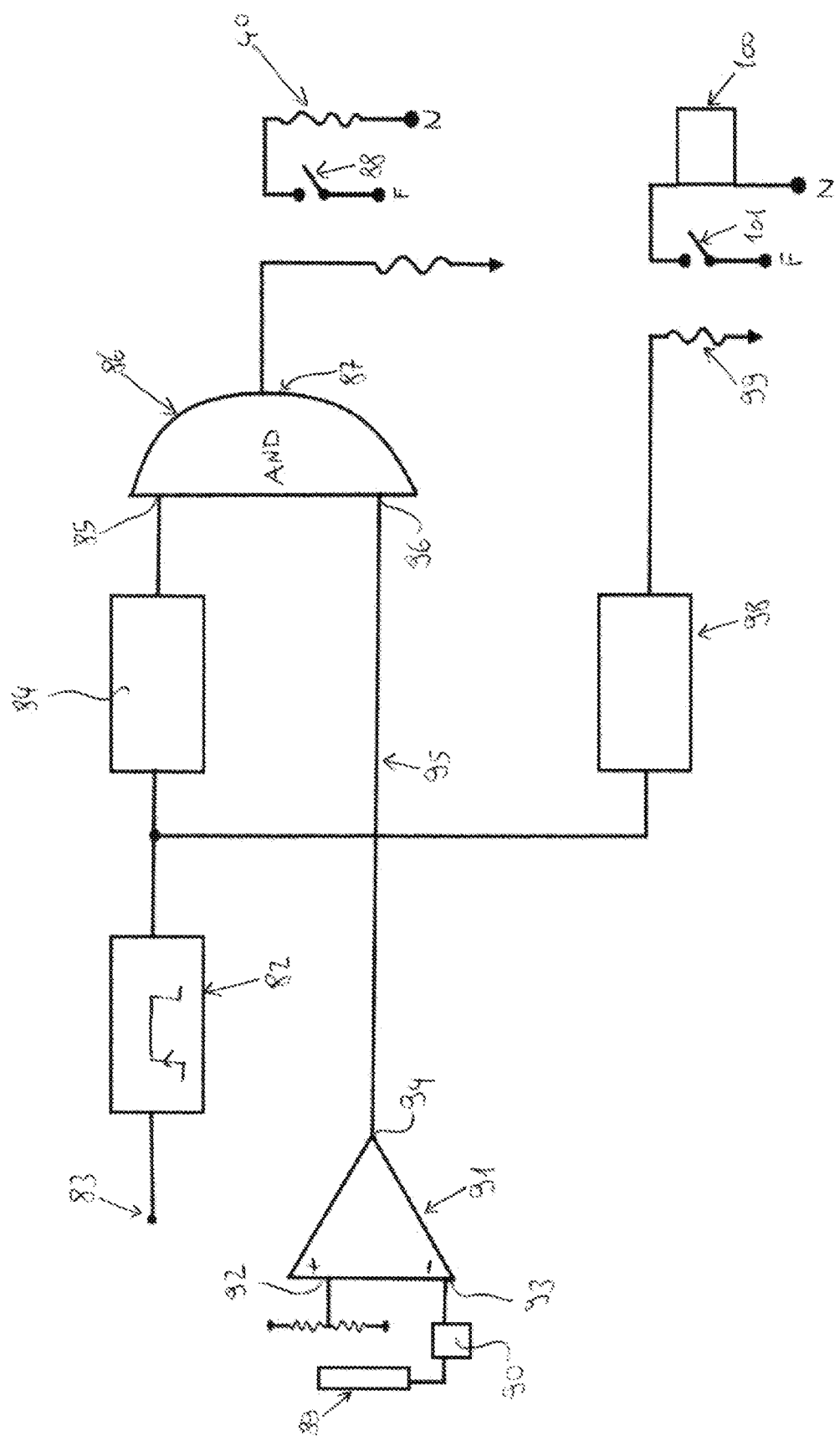

COMBINED APPARATUS FOR HEATING, COOKING, GRILLING AND DEFROSTING OF FOODS OF VARIOUS KIND

FIELD

The invention relates to a combined apparatus for heating, cooking, grilling and defrosting of foods of various kind, comprising in a single structure a set of different component parts, connected into single circuits which can be controlled separately for treating selectively, depending on the needs and the requests, the foods from time to time with either one or more of the processes of heating, cooking, grilling and defrosting of the same foods.

BACKGROUND

At the present time, there are known single apparatuses for hot treating the foods, for performing respectively processes of heating, cooking, grilling and defrosting of the foods, with different temperatures and durations, depending on the nature of foods and the duration of the relevant treatment processes, for obtaining from time to time the desired results.

In this way, for performing these treatments of the foods, it is necessary to have at disposal respective single autonomous apparatuses which operate independently from each other, and the presence of these apparatuses involves a set of costs for buying, operating and maintaining thereof, and moreover the availability of many space for housing and installing the same apparatuses and, in the case in which such apparatuses should be installed into furniture and/or furnishings which can be found on the market, the need of buying such furniture and/or furnishings with dimensions fit with the sizes of the various apparatuses to be utilized, which fact involves further costs and the availability of greater spaces.

SUMMARY

The object of the present invention is to made a combined apparatus for heating, cooking, grilling and defrosting of foods of various kind, which includes in a single structure, taking up a single space, a set of component parts which are included therein and are different to each other, and connected into single circuits and which can be controlled separately, for treating selectively, depending on the needs and the requests, the foods from time to time with either one or more of the processes of heating, cooking, grilling and defrosting of the same foods.

With the combined apparatus for treating the foods according to the present invention, it is therefore possible to avoid the need to have at disposal, as it occurs at the present time, of single treatment apparatuses for performing more treatment processes of the kind referred to, with consequent smaller buying costs and reduced availability of space for housing and installing this apparatus.

Further advantages deriving from the use of the apparatus in accordance to the invention are, for each treatment process of foods which is requested, a greater speed for performing the relative treatment process, with consequent greater productivity and greater quantity of treated foods, the increase of the varieties of the foods capable of being treated, the capability of maintaining the organoleptic properties of the same foods during and after the performance of each treatment process, the modularity of this system for treating foods, the treatment of the oils and the smokes relative to the kind of treatment performed from time to time, into a single apparatus instead of into more apparatuses as it occurs at the present time, and the capability of setting selectively in this single apparatus the different operative programs for performing the treatment processes requested from time to time and which are needed for treating correctly and with the established durations the same foods.

BRIEF DESCRIPTION OF THE FIGURES

The combined apparatus according to the invention is made with the characteristics substantially described hereinafter, by way of a not-limitative example only and with reference to the accompanying drawings, in which:

FIG. 3a shows a cutaway along the horizontal plane A of FIG. 3;

FIG. 4 shows a cutaway perspective front view of the present apparatus;

FIG. 4a shows a cutaway along the vertical plane B of FIG. 4;

FIG. 5 shows a cutaway perspective side view of the present apparatus;

FIG. 5a shows a cutaway along the vertical plane C of FIG. 5;

FIG. 10 shows a plan view of a heating plate including the heating elements, in a third embodiment thereof;

FIG. 11 shows a perspective view the heating plate of the FIG. 10, shown from the upper side thereof;

FIG. 11a shows in a perspective view the heating plate of the FIG. 10, shown from the lower side thereof;

FIG. 12 shows a schematic perspective front view of a loading cell, for weighing the foods disposed on to the plates of the FIGS. 6, 7, 8, 8a, 9, 10, 11, 11a;

FIG. 13 shows a plan view of the FIG. 3, with some randomly arranged paths in the interior of the cooking room of the microwaves being generated in the present apparatus and which are transmitted in the interior thereof;

FIG. 14 shows a perspective front view identical to that of the FIG. 3 of the present combined apparatus, with some paths for the circulation of cooling air for the apparatus interior;

FIG. 15 shows a perspective front view of the back wall of the present apparatus, with further paths for the circulation of cooling air in the apparatus interior;

FIG. 16 shows a perspective front view identical and partial with respect to that of the FIG. 2, with a further path for the circulation of cooling air in the apparatus interior; and FIG. 17 shows an example of a principle scheme of some electric circuits installed in the present apparatus, in the example the ones provided for supplying the heating elements, the microwaves generation circuits and also other circuits of the same apparatus.

DETAILD DESCRIPTION OF THE EMBODIMENTS

Figure 1:
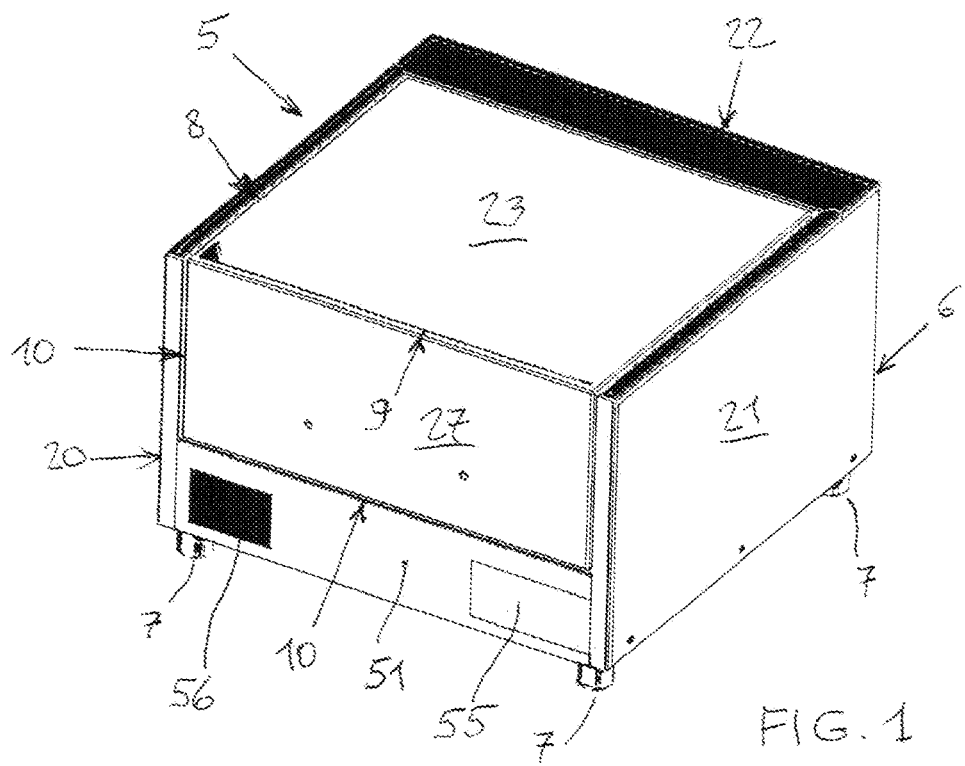
FIG. 1 shows a perspective front view of the combined apparatus for treating foods according to the invention, in the closed condition thereof.
Figure 2:
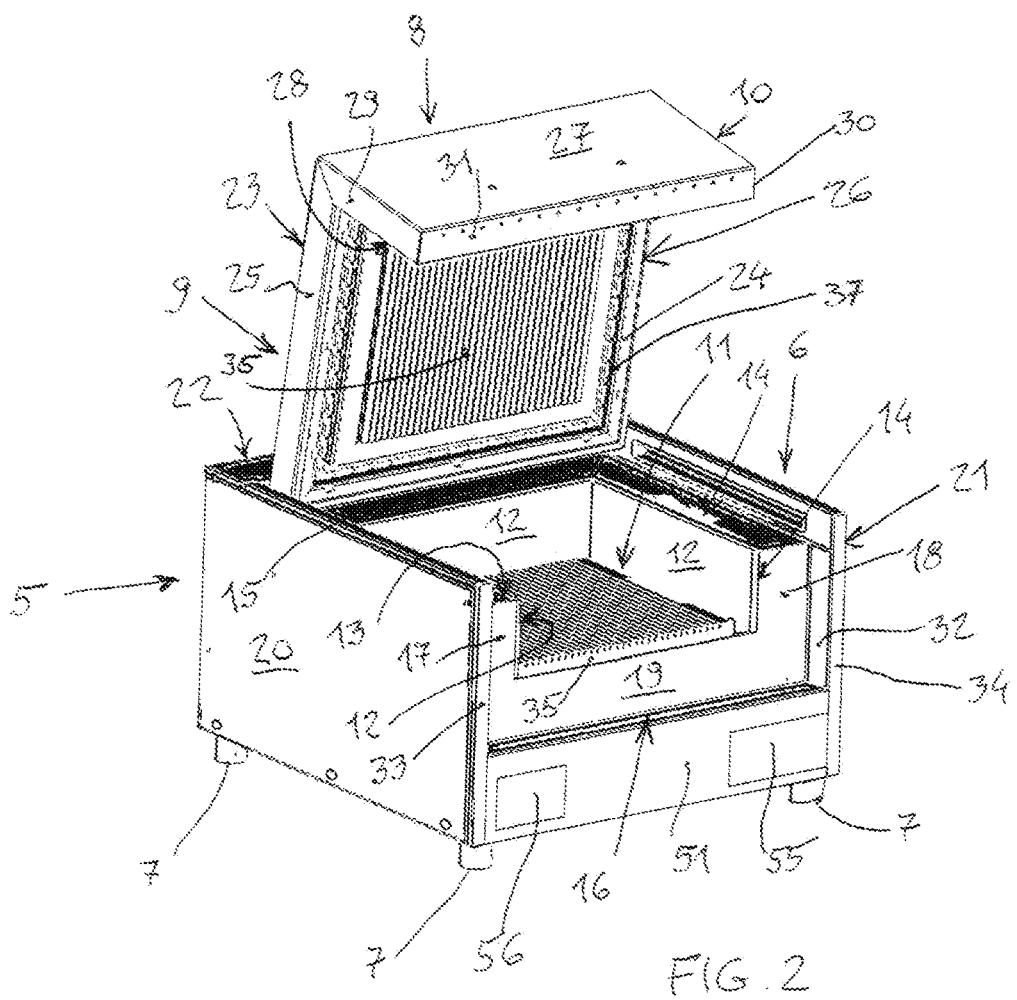
FIG. 2 shows, with the same view of the FIG. 1, the combined apparatus of the FIG. 1 with the opened cover and the visible inner cooking room thereof.

In the FIGS. 1 and 2 it is illustrated the combined apparatus 5 according to the present invention, which is provided for determining selectively the heating, the cooking, the grilling and the defrosting of foods of various kind, depending on the kind of foods to be treated from time to time and the duration of the foods treatment foreseen by each user of the same apparatus.

The combined apparatus 5 comprises, in a single structure, a set of different component parts, connected into single circuits and which can be controlled separately by each user, for treating selectively, depending on the needs and the requests of the user, the foods from time to time with either one or more of the processes of heating, cooking, grilling and defrosting of the same foods.

As visible from such Figures, the present combined apparatus comprises substantially a box-like covering and containing envelope 6 made of metal or also of other solid material and with parallelepiped shape, or other suitable geometrical shape, in the lower part of which there are mounted some supporting feet 7, which may be adjusted or not adjusted in height, and suitable for being laid and/or installed on to supporting surfaces of various type of the room into which the apparatus is installed. The combined apparatus 5 comprises moreover an upper cover 8, hinged to the box-like envelope 6 near its upper and back end portion and which can be actuated either manually by the user from the front part of the same envelope, or with an automatic opening at the end of the food cooking, in a manner to be able to be displaced from a lowered closed position thereof visible in the FIG. 1, in which the cover is aligned in the horizontal position with the remaining upper surface of the envelope, and the interior of the envelope cannot be accessible from the outside, to a raised opened position thereof visible in the FIG. 2, in which the cover is upset upward and arranged in the vertical position thereof almost orthogonal with respect to the remaining upper surface of the envelope 6 and the interior of the envelope is accessible from the outside.

Such upper cover 8 which can be upset is formed by a first flat cover portion 9 and by a second flat cover portion 10, joined to the first cover portion 9 at its front end portion, which is folded orthogonally frontwards with respect to such flat portion 9, and this second cover portion 10 is made with a smaller surface with respect to the surface of such first cover portion 9.

The cover may be also actuated automatically. The box-like envelope 6 also comprises an inner treatment room 11 for the foods, having a box-like shape, adapted to contain the foods to be hot treated and which is opened upwards, and provided in the upper side of the envelope 6, such inner treatment room being made of parallelepiped form or other suitable geometrical form and with dimensions which are smaller than those external of the box-like envelope 6 and being opened frontally and enclosed along its remaining peripheral sides by means of a metallic material in case covered in its inner sides by insulating material 12, such as for example refractory ceramic material, or material withstanding the high temperatures and suitable to contact the food.

Besides, the inner treatment room 11 is also open frontally and delimited by two side peripheral walls 13 and 14 and by a back peripheral wall 15, which are joined to each other and all having the same height, and the side walls 13 and 14 are covered by a front metallic plate 16, shaped with two vertical side flanks 17 and 18 and a vertical lower rectangular plate 19, of which the vertical flanks 17 and 18 have the same form and thickness and height of the relative side walls 13 and 14 and the lower plate 19 is joined to the side flanks 17 and 18 and has a determined height, and its upper edge (not indicated) finds itself at the height of the bottom (not indicated) of the apparatus inner room 11, while the lower edge of such lower plate 19 delimits an underlying inner room (not indicated) of the apparatus, which will be hereinafter described. In turn, the box-like envelope 6 is delimited by two side and vertical peripheral walls 20 and 21 and by a back and vertical peripheral wall 22, all having the same height and higher than the side walls 13 and 14 and the back wall 15 of the inner room 11, of such an extent as to permit in this space to provide for housing the first cover portion 9 when the upper cover 8 is displaced into its lowered closing position.

Such upper cover 8 is realized with an external wall and an inner wall (not indicated) enclosing also an insulating material, such as for example foamed polyurethane or any other insulation withstanding the temperatures, which isn't visible into said FIGS. 1 and 2, while in the first cover portion 9 there are indicated with 23 its upper wall, which may be made of metallic or not metallic material, and with 24 its lower wall, of metallic material, which walls are joined to each other by two thin side walls 25 and 26, and by a back wall (not indicated), all of metallic or not metallic material, which enclose the insulating material contained into the first cover portion 9.

In turn, in the second cover portion 10 there are indicated with 27 its upper wall, which may be made of metallic or not metallic material, with 28 its lower wall, of metallic material, which walls are joined to each other by both two thin side walls 29 and 30, having the same thickness of the side walls and the back wall of the first cover portion 9, and by a lower wall 31 made of metallic or not metallic material, which walls enclose the insulating material contained into the second cover portion 10. Furthermore, such upper cover 8 is so dimensioned that into its lowered position (see the FIG. 1) the first cover portion 9 adapts itself perfectly on to the entire horizontal upper edge (not indicated) of the peripheral walls 13, 14 and 15 of the inner room 11, by covering it completely and in this way by preventing the access from the top into the same inner room, while the second cover portion 10 adapts itself perfectly in the seat provided in the front part of the box-like envelope 6 and formed by a front space 32 delimited between the exterior vertical edges 33 and 34 of the vertical side walls 20 and 21 of the envelope 6 and the vertical external surface of the flat plate 16, which is re-entering with respect to such external vertical edges 33 and 34.

Then, in this lowered position of the upper cover 8, the second cover portion 10 too adapts itself perfectly in to said seat, by covering it completely and thereby preventing the access from the front side to the inner treatment room 11, and under this condition such treatment room is insulated outwards by the presence of the insulating material 12 and by that of the upper cover 8, so that the heat produced into said treatment room during the various processes of treatment of the foods disposed into the same room isn't dispersed outwards.

Figure 6:
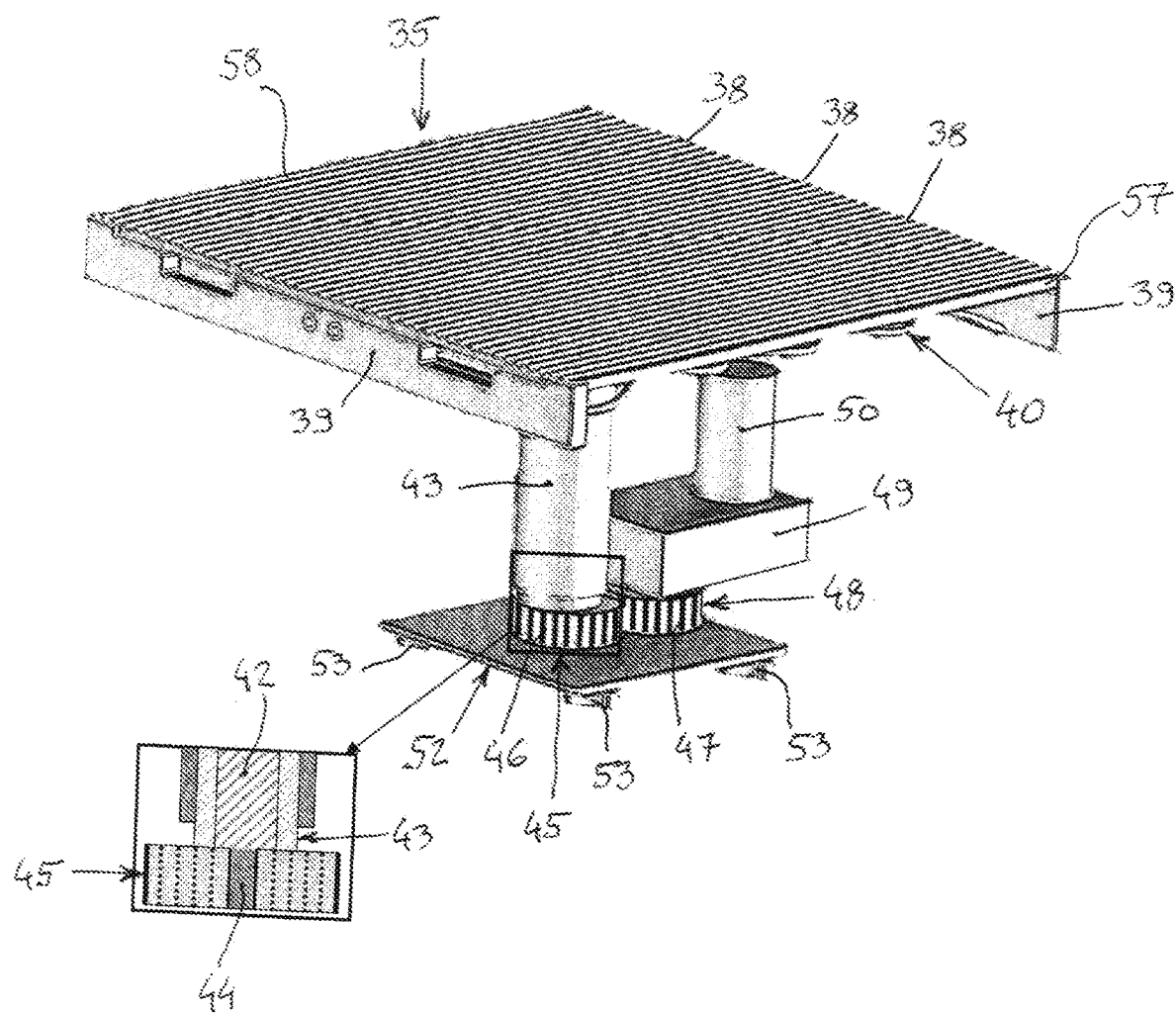
FIG. 6 shows a perspective front view of the upper surface of the lower horizontal plate of the present combined apparatus, on to which there are disposed the foods to be hot treated, wherein such lower plate is supported on to some component parts for adjusting in height and for weighing the foods.
Figure 7:
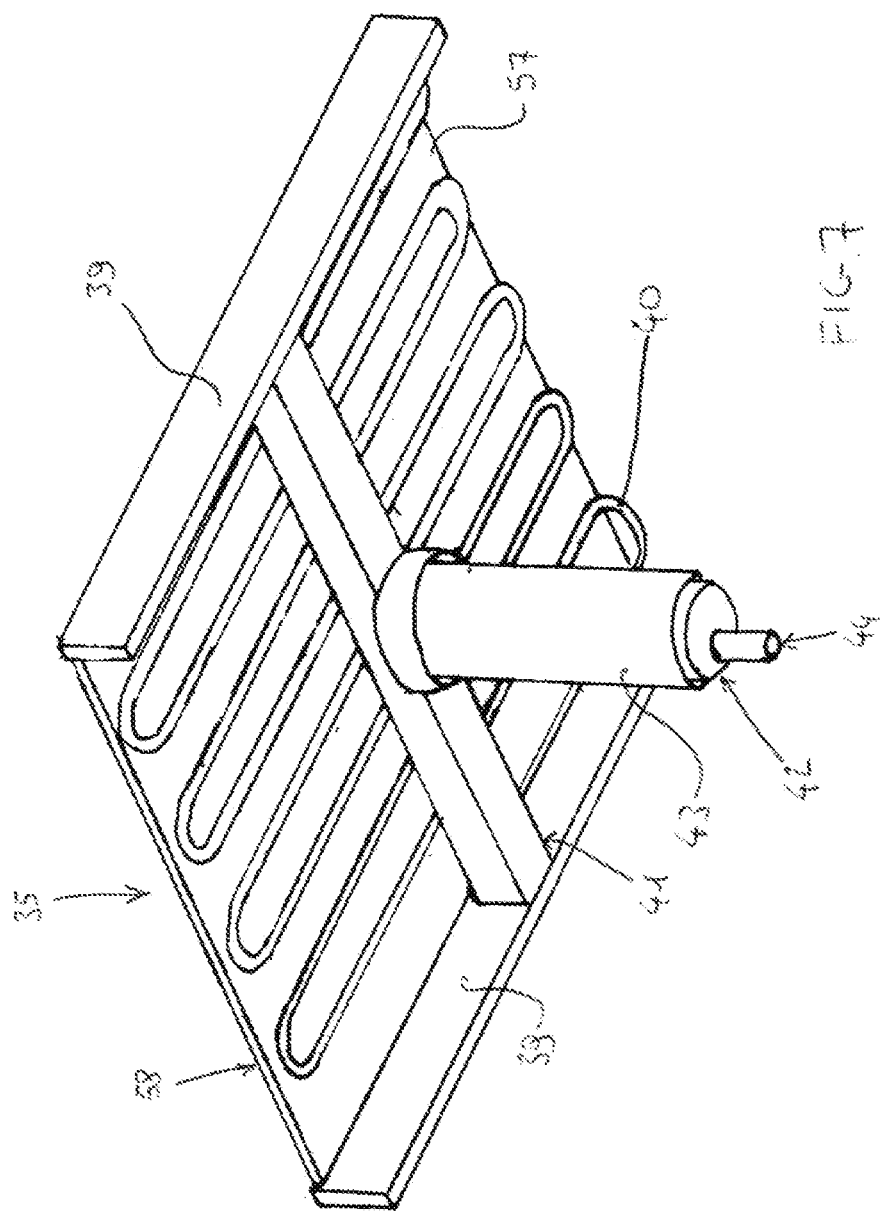
FIG. 7 shows a perspective front view of the lower surface of the plate and the component parts visible in the FIG. 6, wherein below the lower surface of the plate there are applied the heating elements of the same plate and of the foods, in a first embodiment thereof.

Turning now to the FIG. 2, it is noted that in the inner treatment room 11 of the present apparatus it is housed in a stationary manner or a removable manner at least a lower heating plate 35, which adapts itself perfectly for the entire width of the part of inner room delimited by the insulating material 12, and which is realized as it will be described later on in detail in the FIGS. 6 and 7, and is movable in the vertical direction in the opening (not indicated) delimited by said insulating material 12, and such lower plate serves to support the foods to be treated which are laid on to its upper surface, in order to treat the same foods with the respectively foreseen process.

Such lower plate 35 is composed of a radio-transparent material, such as for example some pyroceram material, or other material not necessarily radio-transparent, but having some elements permitting the transmission of the microwaves from the lower side to the upper side of the plate, and vice versa, such as for example some slots, and anyway a material adapted to maintain the temperatures which may be reached in the inner room 11, and which will be obtained as it will be described later on, and which moreover has a good mechanical and thermic strength and be fit for contacting the foods. In turn, in the lower wall 24 of the first cover portion 9 at least an upper heating plate 36 is fixed, which adapts itself for a part of the width of said lower wall 24 and is shaped with a smooth external surface thereof or with a wrinkled external surface with small grooves parallel to each other, extended for example in the length direction of the cover portion 9, in a manner that in the lowered position of the upper cover 8 and therefore also of the cover portion 9 the foods to be hot treated be enclosed between the smooth or wrinkled external surface of the upper plate 36 and the external surface of the lower heating plate 35, which is also shaped smooth or wrinkled with small grooves extended for example in the depth direction of the inner room 11.

Such upper plate 36 is also composed of a radio-transparent material or another material not necessarily radio-transparent, of per se known type, which maintain the temperatures which may be reached in the internal room 11, and which are obtained as it will be described later on, and which moreover has a good mechanical and thermic strength and sturdiness and which be suitable for contacting the foods. The heat of each treatment process of the foods in the inner room 11 is produced by a set of electric heating elements (not indicated), which may be included into at least one of the two plates, either upper one 36 or lower one 35, and such electric heating elements are connected to a relative electric supply cable (not indicated), which is connected to the electric supply line of the ambient on which the apparatus is installed. The heating temperature of the heating elements is regulated thermostatically, and detected by at least a temperature detecting sensor, such as for example a thermocouple or similar means (not indicated), which is applied near at least one of the heating elements and is connected electrically to the thermostatic regulating device of the heating temperature, which is regulated for reaching the heating temperature from time to time desired for determining the requested hot treatment of foods.

The plate which isn't provided with the heating elements is heated, together with the foods, by means of thermic conduction by the heat produced by the heating elements included in to the other plate. Still examining the FIGS. 1 and 2, it is noted that the upper heating plate 36 is enclosed for its entire perimeter by a structure 37 for shielding the microwaves being generated and conveyed in the interior of the apparatus as it will be described hereinafter, and such structure 37 is inserted into and secured to a groove (not indicated) provided in the cover portion 9 and slightly spaced away all around the upper heating plate 36. Besides, such shielding structure is scientifically called choke, of per se known type, and is constituted preferably by a metallic material, in case replaced and/or coupled to a contact electromagnetic gasket.

In this way, the foods being introduced in the inner room 11, in a position interposed between said upper plate 36 and lower plate 35, in the closed position of the upper cover 8, may be hot treated by means of the heating produced either by the electric elements of one of said plates, or by the microwaves which are generated as it will be described later on, or by the combined heating of the electric elements and the microwaves, depending on the type of treatment of foods from time to time desired and, in the case of treatment with microwaves, the dispersions of these latter outwards the apparatus is prevented by said shielding structure 37. In the FIGS. 6 and 7 it is now shown the lower heating plate 35, which is made like the upper plate 36 and has the same width thereof, and such lower plate 35 is also shaped with its smooth or wrinkled external surface and, in the illustrated example, such external surface is provided with wrinkling 38 which, in addition to ensuring the cooking of foods by the contact therewith, serves to collect the greases and the liquids produced during the cooking, and for unloading them towards an underlying collecting and discharging structure, which will be described later on.

Figure 8:
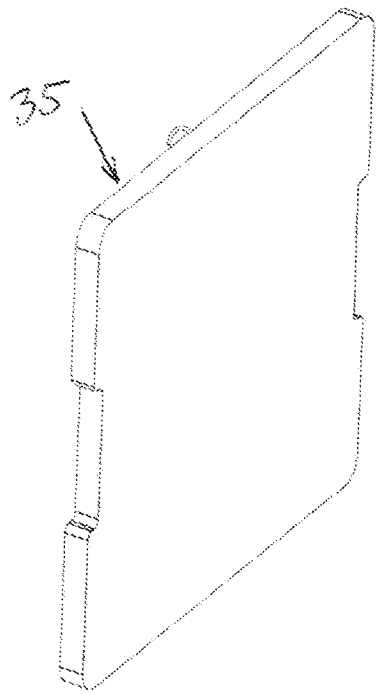
FIG. 8 shows a perspective view of a heating plate, viewed from the upper side thereof, which includes the heating elements, in a second embodiment thereof.
Figure 8A:
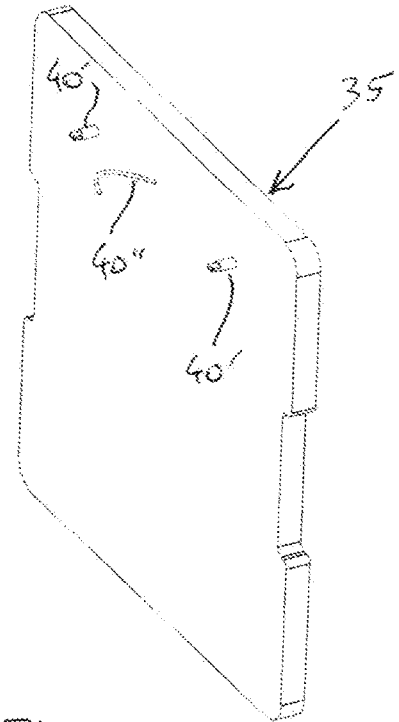
FIG. 8a shows a perspective view of a heating plate, viewed from the lower side thereof, which includes the heating elements, in a second embodiment thereof.
Figure 9:
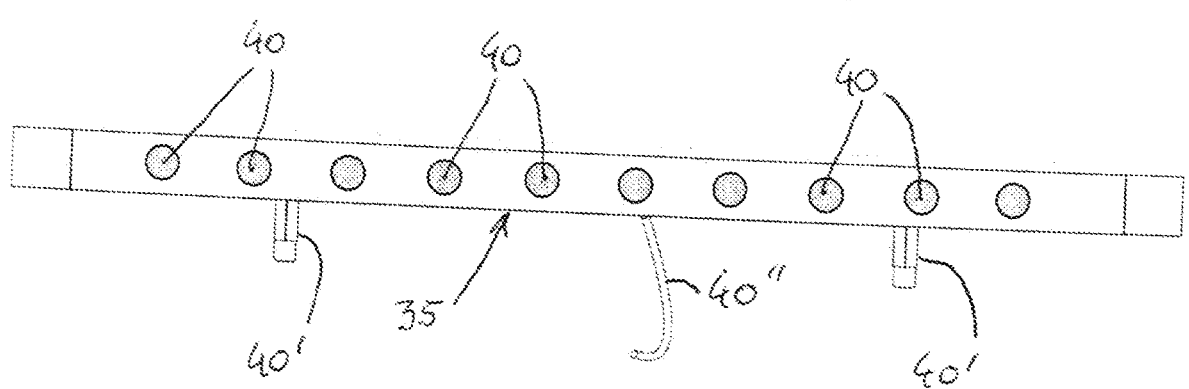
FIG. 9 shows a cutaway front view of the heating plate of the FIGS. 8 and 8a, with the heating elements included therein.

The lower heating plate 35 is joined to two narrow side supports 39 folded downwards, which adapt themselves through the opening (not indicated) delimited by the insulating material 12, in a manner that the plate 35 might move itself limitedly in the vertical direction through such opening, as it will be described hereinafter. Furthermore, as visible in the FIG. 7, on the entire lower surface of the lower plate 35 there are fixed suitably, in a first embodiment thereof, the electric heating elements 40 shaped like a coil, which serve to heat at the desired temperature the entire lower plate 35 and which are supplied by the electric supply line with the above specified criteria. In the FIGS. 8, 8a and 9 it is shown a second possible embodiment of the electric heating elements 40, in this example still mounted in the lower heating plate 35. Then, in this case, the heating plate 35 is obtained by pouring the radio-transparent material withstanding the high temperatures, and by including in the interior of the material of the plate both the heating elements 40, still shaped as a coil, and the internal part of the electric connections of the heating elements 40, which is joined with an external part 40' slightly projected from the lower side of the same plate, for being so connected to the electric supply line of the present combined apparatus, and the internal part of the electrical connection of the heating temperature detecting probe of the plate, which part is joined with an external part 40" slightly projected from the lower side of the plate 35, for being also connected to the electric supply line of the apparatus referred to.

In the description of the heating plate 35, the upper external surface thereof is shown smooth, but it may be shaped in the wrinkled manner too, as previously. Moreover, the above described electric connections could be positioned even into positions different from those represented, depending on the system for moving vertically the plate, in order to apply such connections in the interior of this vertically moving system. In the FIGS. 10, 11 and 11a it is shown a third possible embodiment of the electric heating elements 40 (not visible in these Figures), which are still included in the interior of the material of the heating plate 35. Then, in this case the heating plate 35 is obtained by pouring some not radio-transparent material withstanding the high temperatures and by including in the interior of the plate material still the internal part of the electric connections of the heating elements 40, still shaped like a coil, which internal part is joined to an external part 40' slightly projected from the lower side of the same plate, for being so connected to the electric supply line of the present apparatus, and the internal part of the electrical connection of the heating temperature detecting probe for the plate 35, which part is joined to an external part 40" slightly projected from the lower side of the plate 35, for being also connected to the electric supply line of the apparatus.

Also in this case, the plate 35 is shown with its smooth upper surface, but such surface may also be shaped wrinkled, as previously. Since the plate material isn't transparent to the microwaves, for permitting the microwaves to pass from a part to another one of the plate, the material thereof is provided with a plurality of through slots 40''', in a manner to permit the microwaves to distribute themselves homogeneously in the inner room 11, as indicated in the FIG. 13. For supporting further on from below the lower heating plate 35, which as already described previously may be moved in the vertical direction, such plate is moreover adjustable in height at different heights, in the manner and with the transmission members described later on, and is provided with a support structure formed in the present example by a bar 41, which is secured in the central and transversal position between the side supports 39 and includes the electric heating elements 40. Besides, below the transversal bar 41 there are also secured both the movement transmission members, for providing for the adjustment in height of the lower heating plate 35, and the foods weighing members during the hot treatment, which latter are from time to time supported between the two plates 35 and 36.

These movement transmission members are substantially constituted by at least a vertical nut screw 42 which is housed in the internal cavity of a correspondent vertical container 43, and the upper end portion of which is fixed to the lower surface of the bar 41, at the central zone thereof, and is projected from this latter downwards for a determinate length, and the lower end portion of such nut screw 42 forms a vertical rotation axis 44 which is keyed in the central hole (not shown) of a correspondent gear 45 with horizontal rotation, the teeth 46 of which mesh the teeth 47 of another gear 48 with horizontal rotation, which in turn is connected with its central hole through a shaft (not shown) with a set of gears (not shown too) housed into a box 49 and actuated by an electric motor (not shown too) housed and fixed into a correspondent vertical container 50, in the example installed on to the gear box 49, said electric motor being connected to the electric supply line by means of electric conductors (not visible). In this way, the actuation in rotation of the electric motor, in either one of its rotation directions, selected by the user in the apparatus or in an automatic manner through the foods weighing members, provides for the movement transmission to the gears and from these latter to the gears and the nut screw, with consequent regulation in height of the lower plate 35 in the respectively desired position thereof. The protection sphere of the invention foresees also the possibility to utilize movement transmission members which are different than those ones here described by way of example only, for providing for the regulation in height of the lower plate 35. Besides, it is to point out also that there are also provided further electric cables (not indicated) connected to both the heating elements 40 and the above mentioned temperature detecting sensor of the heating elements, for supplying electrically these component parts.

Figure 3:
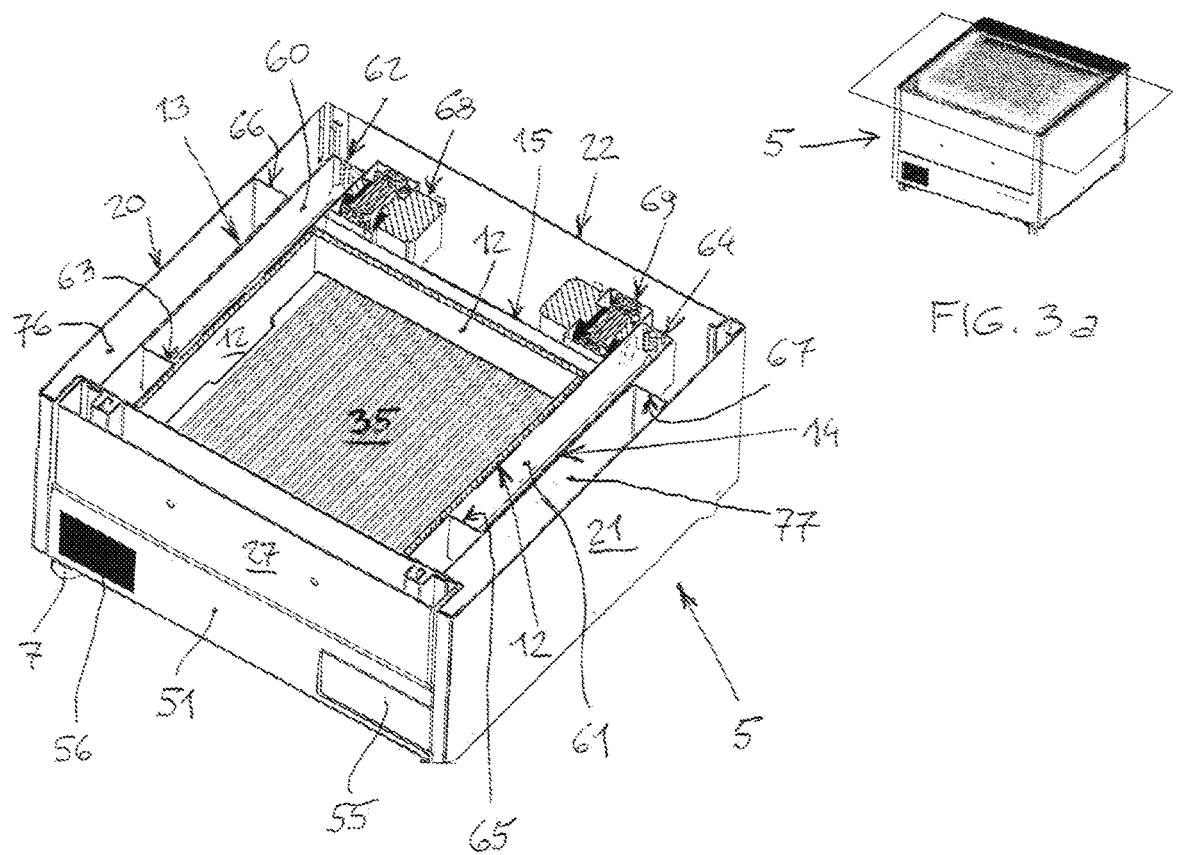
FIG. 3 shows a perspective front view of the present combined apparatus, without the cover and with the inner cooking room and some component parts thereof which are visible.

All the above described movement transmission members as well as the foods weighing members, which will be shortly described, are housed in the present combined apparatus into a space below the inner treatment room 11, which is delimited by a front closing wall 51 (see FIGS. 1-3), by the back closing wall 22 and by the side walls 20 and 21 of the box-like envelope 6.

Figure 12:
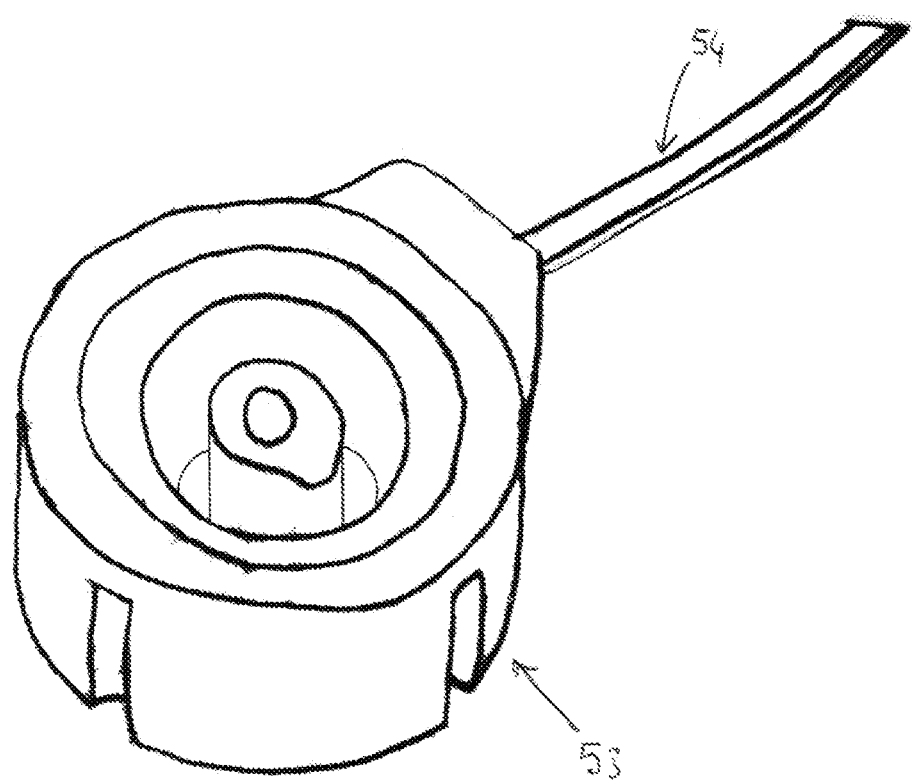

As still visible in the FIG. 6, the gears 45 and 48 are pivoted and supported on to the upper surface of a horizontal flat plate 52, housed and fixed in the above mentioned space below the inner treatment room 11, and such horizontal plate 52 is laid with its lower surface on to the foods weighing members, which are constituted preferably by at least a per se known loading cell 53, which in turn is supported on to the flat bottom (not shown) of the box-like envelope 6 of the present combined apparatus. In the example of the FIG. 6, it is noted that there are provided advantageously several loading cells 53, distributed in a regular manner for being able to measure effectively the weight of the foods disposed on to the lower plate 35. Each loading cell 53 is connected by an electric conductor 54 (see FIG. 12) with the control board (not indicated) situated on the front part of the present apparatus, for transmitting the information of the effected weigh measures and for being controlled through the same control board. In the control board there are mounted some selector push-buttons with the relative display for selecting the different operative programs from time to time desired for heating, grilling and defrosting the foods, depending on the type and the quantity of foods to be hot treated, and for regulating the power, the temperatures and the times of the desired treatments. In the FIGS. 1-3 moreover it is noted that in the front closing wall 51 there are provided two through openings (not indicated) spaced away from each other in the horizontal direction, in which there are respectively inserted an extractable drawer 55 (at the right side) for collecting some greases and liquids being formed during the foods hot treatment, and for discharging outside these substances, and it is applied a display 56 (at the left side) operatively connected to the control board in order to display or set the treatment operative cycle selected from time to time. In the FIG. 4 it is noted the assembling in the apparatus inner room 11 of the assembly of the lower heating plate 35 and the transmission members for the raising and lowering movement of the same plate, as well as of the loading cells. In this case, it is noted that a single vertical nut screw 42 only is provided, which co-operates with the other gears (not indicated) of the transmission members, and that the back edge 57 and the front edge 58 of the lower plate 35 find themselves respectively in correspondence of the back wall 15 and the front lower plate 19 (not indicated) of the inner room 11. In the FIG. 4 moreover it is noted that the lower plate 35 is raised in a manner that the food to be hot treated 59 disposed in the inner room 11 be interposed and kept between the movable lower plate 35 and the stationary upper plate 36, so as to be able to be hot treated by the heating devices installed in the apparatus, namely by the heating elements 40 and/or even by the microwaves being generated and directed in the inner room 11 as it will be hereinafter described. Turning now to the FIGS. 3 and 4, it is noted that between the side wall 20 of the box-like envelope 6 and the opposite insulating material 12 a first rectilinear channel 60 is provided, and between the side wall 21 of the envelope 6 and the opposite insulating material 12 a second rectilinear channel 61 is provided, which channels are delimited at their end portions by closed bottom walls marked with 63 and 63 for the first channel 60 and with 64 and 65 for the second channel 61. Furthermore, both the channels 60 and 61 are supported in position by means of relative transversal walls 66 and 67 which are fixed with the corresponding side walls 20 and 21 of the box-like envelope 6. The channels 60 and 61 form the wave guides for the passage of the microwaves generated by a relative magnetron 68 and 69, of per se known type, which are secured in a position spaced away from each other near the relative closed bottom walls 62 and 64 of the channels 60 and 61. The number of the magnetrons and the wave guides may be different.

Such magnetrons 68 and 69 are supplied through relative high voltage transformers 70 and 71 (see FIG. 5) supplied by the electric line and, in the present case, secured spaced away to each other to the envelope bottom wall 72 of the present apparatus. The number and position of the transformers may be different. The magnetrons 68 and 69 have a power comprised preferably between 100 W and 2000 W each one, with a main frequency of 2.45 GHz+1 GHz.

The antenna of each magnetron 68 and 69, referred to with 73 for the magnetron 68 and with 74 for the magnetron 69 enters the relative wave guide channel 60 and 61 for conveying the generated microwaves (see FIG. 3) therein, and in turn each wave guide channel is provided with slots (not indicated in the FIG. 3 but visible in the FIGS. 5 and 13) and marked with the reference numerals 75, which put into communication each wave guide with the inner treatment room 11 of the present apparatus, for conveying into the same inner room the microwaves for the foods hot treatment.

Such slots 75 have some interfaces of glass or any other radio-transparent material, suitable to withstand the temperatures which may be reached in the inner room 11 (up to about 400° C.).

Laterally to each wave guide channel 60 and 61 a relative ventilation channel 76 and 77 is provided, which is connected with the corresponding wave guide, in turn connected to at least a cooling fan (not shown), supplied by the electric line and controlled through the apparatus control board, and the switching on of such cooling fan produces an air flow circulating through both the wave guide channels 60 and 61, and through the magnetrons 68 and 69, with consequent cooling of both the heat produced on to the side walls of the room 11 and the same magnetrons, and such cooling air flows with the picked up heat are finally discharged outside the apparatus through suitable discharging openings both 78 a, provided in the envelope 6, as visible in the FIGS. 14, and 78 as visible in the FIG. 15. In the FIGS. 4 and 5 it is now noted the inner treatment room 11 of the present apparatus, which is shaped at its lower part with an inclined base plane 79, which is extended for the entire length of the same room and has an inclination directed downwards starting from the back wall 15 of said inner room 11, and the front end portion 80 of which is adequately shaped for collecting the greases and the liquids produced during the hot treatment of each food, and terminates near the extractable drawer 55, in a manner that these substances flowing downwards on to the upper surface of such base plane 79 collect themselves progressively on the shaped and portion 80 and, by passing through one or more slots or small tubes (not indicated) communicating with the extractable drawer 55, fall down and be collected into the same drawer, so that by extracting this latter they might be disposed of outside. The slots have such geometries as to prevent the microwaves from passing therethrough and to come into contact with the greases and the oils being collected in to the drawer 55. Through the base plane 79 are passing the movement transmission members of the lower heating plate 35 which, as already described, move in height such lower plate, which is situated on to the base plane 79.

The internal room 11 is internally insulated, as already explained, with the insulating material 12, but it may be insulated also externally with a further insulating material for example of the ceramic type (not indicated), which must withstand the high temperatures. The inclined base plane 79 is disposed on to and supported by an underlying inclined bottom 81 of the box-like envelope 6, having the same inclination of that of the base plane 79 and which does not perform the same function of collecting the substances like this latter, and extends itself in the lower part for the entire width of such envelope 6, and between the base plane 79 and the inclined bottom 81 it may be also disposed either a suitable insulating material of the kind referred to, or it may be maintained an empty layer for the passage of the cooling air of the inner room 11 which is hotter.

Finally, in the FIG. 13 it is shown the circulation path of the microwaves being generated by the magnetrons 68 and 69, which as noticed pass through the relative wave guide channels 60 and 61 and enter the internal room 11 through the above slots 75, and in the internal room the microwaves are submitted to many reflexions and changes of direction as visible in the example of the same FIG. 13, the energy of which being absorbed by the food determines in this way the heating of the same food which is situated into said internal room. In the FIG. 17 it is now shown an example of a schema of electromechanical principle in the apparatus according to the invention, for controlling the separate and/or contemporaneous switching on of the electric circuits for supplying the heating elements 40 of at least one of the heating plates of foods, in the above described example the lower heating plate 35 and/or the magnetrons 68 and 69 for generating the microwaves.

In the upper part of this Figure, there are noted the electric circuits for controlling the heating elements 40, while in the lower part of the Figure there are noted the circuits for controlling the generation of the microwaves. In accordance to the present invention, the switching on and off of the heating elements 40 may be effected by means of either a timer or a temperature probe, for detecting the heating temperature of the active heating plate, in this case the lower heating plate 35.

These components will be shortly described. In turn, the generation of the microwaves may be effected by regulation through a timer, which will be shortly described too.

The use of the heating elements and the microwaves may occur in a single or contemporaneous way, depending on the hot treatment step of foods being selected and of the kind of foods to be treated. Anyway, at the end of each treatment step the operative program will provide for a control for opening the upper cover 8. The software permitting the carrying out of these steps and which is activated and de-activated by acting on to the apparatus control board may activate other functions too, for example the control provided by the loading cells 53, which at first before each treatment step calculate the weight of the food to be hot treated and transmit the detected information to the control board, into which such an information is processed and serves to adjust automatically the necessary power and the times for performing the selected treatment step and the movement of the plates. The control circuits of the heating elements 40 in the example referred to comprise an electric switch 82 connected to the electric supply line 83 and associated to the apparatus upper cover 8, in a manner to be switched on when the cover is closed and switched off when the cover is opened. Besides, these control circuits comprise a timer 84 connected to said electric switch 82 and to a first input 85 of a logic gate AND 86, said timer being adjustable automatically or manually for changing the switched on time requested from time to time for cooking each food 59 being introduced in the internal room 11 and enclosed between the upper heating plate 36 and the lower cooking plate 35. The output 87 of the logic gate AND 86 is connected to the electric supply line and is interacting with a separate high voltage circuit, supplied by the electric supply line and into which at least a heating element 40 and an electric switch 88 are connected, which latter may be actuated manually or automatically in the switched off or on condition thereof. The control circuits of the heating elements 40 in the example referred to also comprise at least an electric temperature probe 89 applied to the active heating plate, in this case the lower plate 35, and suitable for detecting the heating temperature of the same plate during each food hot treatment. Such temperature probe 89 is connected through an electronic amplifier 90 with an electronic comparator 91 of conventional type, at the first input 92 of which it is applied a pre-established reference voltage, and at the second input 93 of which it is connected the above described electronic comparator 90. In turn, the output 94 of such electronic comparator 91 is connected through an electric conductor 95 with the second input 96 of the logic gate AND 86. When the timer 84 is utilized, the heating elements 40 are switched on at the beginning of the cycle by acting on to the apparatus control board, and in such case by actuating the electric switch 88 in the switched on condition thereof.

Under this condition, the first input 85 of the gate AND assumes the logic state 1, while the second input 96 of this gate assumes the logic state 0, so that also the output 87 of such gate is kept de-activated, and the switch 88 is kept switched on, and the heating element 40 is consequently switched on continuously. On the contrary, when the switched on duration of the heating element 40, sets by the timer 84, has been passed, the timer provides for switching off the switch 88, so that the heating elements 40 is switched off, while in turn the first input 85 of the gate AND 86 is kept always supplied through the switch 82 and the timer 84, by maintaining always the logic state 1. On the contrary, when the temperature probe 89 is utilized, under the condition in which the heating elements 40 are already switched on as previously, such probe detects the temperatures of the heating elements 40 and generates correspondent levels of electric voltage which are applied to the second input 93 of the comparator 91, through the amplifier 90, where such levels are compared continuously with the level of the reference voltage of the first input 92. As long as the level of the electric voltage so generated by the temperature probe 89 is lower than the level of the electric reference voltage of the first input 92 of the same comparator, the temperature of the heating plate is lower or at least equal to the heating temperature of the heating plate 35, for which the cooking of the food occurs in a regular manner and without dangers of burns or damaging of the foods being cooked.

Then, under this condition, the output 94 of the comparator 91 does not assume a level of electric voltage, so that also the second input 96 of the gate AND 86 remains at the logic state 0 and, under this condition, the two inputs 85 and 96 of such gate AND 86 have logic states which are different to each other, so that the output 87 of the logic gate AND 86 remains at the logic state 0 and therefore the switch 88 isn't actuated by such output, with consequent maintenance steadily switched on of the heating element 40. On the contrary, when the level of the electric voltage generated by the temperature probe 89 and applied to the second input 93 is identical to the level of the reference voltage of the first input 92 of the comparator 91, under the condition in which the heating temperature foresees in the heating plate 35 has been attained, the output 94 assumes a voltage level and therefore the second input 96 of the logic gate 86 too assumes the logic state 1.

And under this condition, the output 87 of such logic gate too assumes the logic state 1 and therefore the presence of this voltage provides for actuating the electric switch 88 in the switched off state thereof, thereby switching off the heating element 40 and terminating the hot treatment step of the food disposed in the apparatus. Now, there are briefly described the electric control circuits for generating the microwaves, which are substantially constituted by an additional timer 98 connected at one side to a conductor 83 of the electric supply line through an electric conductor 97, at a position comprised between the switch 82 of the upper cover 8 and said timer 84, and at the other side they are connected to the other electric conductor of the electric supply line (not indicated) through a circuit 99 interacting with the control circuitry 100, per se known for each magnetron, into which an electric switch 101 is connected for switching on and off manually or automatically such control circuitry. In this case, by actuating manually or automatically the switch 101 in the switched on state thereof, there are switched on the magnetrons 68 and 69 and it is started the hot treatment step of the foods by means of the microwaves generated by the same magnetrons, and the duration of switching on of such magnetrons is set in advance with the timer 98, so that as long as the switched on duration of such magnetrons has not been passed, the switch 101 remains supplied by the voltage and actuated in the switched on state thereof, with consequent active maintenance of the microwave heating of the foods introduced in to the internal treatment room 11.

On the contrary, when the switched on duration pre-established by the magnetrons is terminated, under the condition in which the foods have been treated in a correct manner to the pre-established temperature and duration, the supply voltage of the circuit 99 is lacking, so that the switch 101 is actuated in the switched off state thereof thereby switching off the magnetrons and terminating in this way the hot treatment step of the foods. In this manner, the combined apparatus according to the invention allows to perform, with a sole and single apparatus, the hot treatment of the foods with both the electric heating and/or the microwaves too, for providing for in this way the heating, the cooking, the grilling and the defrosting of the same foods, instead of utilizing as it happens hitherto some single separated apparatuses for performing the same functions.

The invention claimed is:

1. A combined apparatus for heating, cooking, grilling and defrosting of food of various kinds, depending on the kinds of food to be treated from time to time and the duration of the food treatment, comprising: a substantially box-like covering and containing envelope made of metal or also of other solid material and with parallelepiped shape, or other geometrical shape, in the lower part of which there are mounted some supporting feet, which is adjusted or not adjusted in height, and suitable for being laid and/or installed on to supporting surfaces of various types the apparatus further comprising an upper cover, hinged to the box-like envelope near its upper and back end portion and which is actuated either manually from the front part of the same envelope, or with an automatic opening at the end of food cooking, and displaceable from a lowered closed position in which the cover is aligned in a horizontal direction with a remaining upper surface of the envelope, and an interior of the envelope cannot be accessible from the outside, to a raised opened position thereof in which the cover is upset upward and arranged in a vertical position thereof almost orthogonal with respect to a remaining upper surface of the envelope and the interior of the envelope is accessible from the outside, the apparatus also comprising at least a control board for controlling carrying out of the different operative programs desired and selected by selector means, depending on the type and the quantity of food to be hot treated, and for regulating the power, the temperatures and the times of the desired treatments, said control board being connected to the apparatus electric circuits, together with heating element of food and temperature detecting means for heating said heating element, the envelope also comprising at least an inner room for the hot treatment of food, for introducing the food to be hot treated, which is accessible or not accessible by closing or opening said upper cover, said inner room being insulated thermally and adapted to be heated singularly either through said heating element or microwave generating means, or the combined action of said heating element and said microwaves generating means, said heating elements being included into at least a first movable lower heating plate or into at least a second stationary upper plate, and said upper cover being formed by a first flat cover portion and by a second flat cover portion, joined to the first cover portion at its front end portion, which is folded orthogonally frontwards with respect to such flat portion, and this second cover portion is made with a smaller surface with respect to the surface of said first cover portion, the upper cover being made with an external wall and an inner wall enclosing an insulating material, such as any insulation withstanding the high temperatures, said upper cover being also dimensioned in a manner that into its lowered position said first cover portion adapted on to the entire horizontal upper edge of said inner room (11), wherein said first heating plate is actuated by powered transmission means, controlled by said control board into different adjustment positions in height, depending on the size and the type of food to be hot treated, for enclosing the food between said two heating plates, said upper heating plate co-operating with weighing means connected operatively with said control board for detecting the weight of food disposed on to said first heating plate and providing for through the same control board the carrying out of each operative program respectively selected and the heating duration of each food, depending on the type and the weight of the food to be treated, and further comprising means for collecting the greases and the liquids produced during each hot treatment step of the food, and for disposing of the same during and after the hot treatment of such food.

2. The apparatus according to claim 1, wherein said lower heating plate is housed in a stationary or a removable manner for the entire width of the part of the inner room delimited by the insulating material and is movable in the vertical direction in the opening delimited by said insulating material, and such lower plate serves to support the food to be treated which are laid on to its upper surface, said lower plate being formed of a radio-transparent material, or other material not necessarily radio-transparent, but permitting the transmission of the microwaves from the lower side to the upper side of said plate, and vice versa, and a material adapted to maintain the temperatures which is reached in the inner room, and which has a good mechanical and thermic strength and be fit for contacting the food.

3. The apparatus according to claim 2, wherein said upper heating plate is fixed in the lower wall of the first cover portion and adapts itself for a part of the width of said lower wall and is shaped with the smooth external surface thereof or with a wrinkled external surface thereof with small grooves parallel to each other, extended in the length direction of the cover portion, in a manner that in the lowered position of the upper cover and therefore also of the cover portion the food to be hot treated be enclosed between the smooth or wrinkled external surface of the upper plate and the external surface of the lower heating plate, which is also shaped smooth or wrinkled with small grooves extended in the depth direction of the inner room, in order to collect the greases and the liquids produced during the cooking by contacting the same, and for discharging them towards said means for collecting the greases and the liquids, said upper plate being also formed of a radio-transparent material or another material not necessarily radio-transparent, which maintains the temperatures which is reached in the internal room, and which has a good mechanical and thermic strength and sturdiness and which be suitable for contacting the food, wherein the plate being in case not provided with the heating elements is heated, together with the food, by thermic conduction by the heat produced by the heating elements included in to the other plate, said upper heating plate being enclosed for its entire perimeter by a structure for shielding the microwaves being generated and conveyed in the interior of the apparatus through said microwaves generating means, and such structure being inserted into and secured to a groove provided in the cover portion and slightly spaced away all around the upper heating plate, said shielding structure being scientifically called choke, and of per se known type, and being constituted preferably by a metallic material, in case replaced and/or coupled to a contact electromagnetic gasket.

4. The apparatus according to claim 3, wherein said lower heating plate is supported by a support structure formed by a transversal bar secured in a central position between some side supports provided in the plate and including said electric heating elements, shaped like a coil, and wherein below said transversal bar there are also secured both said movement transmission members, for determining the adjustment in height of the lower heating plate, and the weighing members of the food during the hot treatment.

5. The apparatus according to claim 4, wherein said movement transmission members are substantially constituted by at least a vertical nut screw which is housed in an internal cavity of a correspondent vertical container, and an upper end portion of which is fixed to a lower surface of said bar, at a central zone thereof, and is projected from this latter downwards for a determinate length, and the lower end portion of such nut screw forms a vertical rotation axis which is keyed in the central hole of a correspondent gear with horizontal rotation, the teeth of which mesh the teeth of another gear with horizontal rotation, which in turn is connected with its central hole through a shaft with a set of gears housed into a box and actuated by an electric motor housed and fixed into a correspondent vertical container, and connected to the electric supply line by electric conductors, in a way that the actuation in rotation of the electric motor, in either one of its rotation directions, selected by the user in the apparatus control board, provides for the movement transmission to the gears and from these latter to the gears and the nut screw, with consequent regulation in height of the lower plate in the respectively desired position thereof, said transmission members and said weighing members being housed into a space below the inner room, which is delimited by a front closing wall, by the back closing wall and by the side walls of the box-like envelope,
and wherein the gears are pivoted and supported on to the upper surface of a horizontal flat plate, housed and fixed in the space below the inner room, and such horizontal plate being laid with its lower surface on to the food weighing members, which are constituted by at least a loading cell, which in turn is supported on to the flat bottom of the box-like envelope, several loading cells being distributed in a regular manner for being able to measure effectively the weight of the food disposed on to the lower plate, wherein each loading cell is connected by an electric conductor with the control board of the present apparatus, for transmitting the information of the effected weight measures and for being controlled through the same control board.

6. The apparatus according to claim 1, wherein in said front closing wall there are provided two through openings, spaced away from each other in the horizontal direction, in which there are respectively inserted an extractable drawer for collecting some greases and liquids being formed during the foods hot treatment, and for discharging outside these substances, and it is applied a display operatively connected to the control board, in order to display or set the treatment operative cycle selected from time to time.

7. The apparatus according to claim 6, wherein between the side wall of the box-like envelope and the opposite insulating material a first rectilinear channel is provided, and between the side wall of the envelope and the opposite insulating material a second rectilinear channel is provided, which channels are delimited at their end portions by closed bottom walls, both the channels being supported in position by relative transversal walls which are fixed with the corresponding side walls of the box-like envelope, said channels forming the wave guides for the passage of the microwaves generated by the relative magnetrons, which are secured in a position spaced away from each other near the relative closed bottom walls of the channels, said magnetrons being supplied through relative high voltage transformers supplied by the electric line and secured spaced away to each other to the bottom wall, said magnetrons having a power between 100 W and 2000 W each one, with a main frequency of 2,45 GHz+1 GHz, and wherein the antenna of each magnetron enters the relative wave guide channel for conveying the generated microwaves therein, and in turn each wave guide channel is provided with slots, which put into communication each wave guide with the inner room, for conveying into the same inner room the microwaves for the food hot treatment, said slots having some interfaces of glass or any other radio-transparent material, suitable to withstand the temperatures which may is reached in the inner room (up to about 400° C.).

8. The apparatus according to claim 7, wherein laterally to each wave guide channel a relative ventilation channel is provided, which is connected with the corresponding wave guide, in turn connected to at least a cooling fan, supplied by the electric line and controlled through the apparatus control board, and the switching on of such cooling fan being producing a cooling air flow circulating through both the wave guide channels, when the microwaves aren't generated, and through the magnetrons, with consequent cooling of the heat produced on to both the side walls of the inner room and the same magnetrons, and such cooling air flows with the picked up heat being finally discharged outside the apparatus.

9. The apparatus according to claim 1, wherein the inner room is shaped at its lower part with an inclined base plane, which is extended for the entire length of the same room and has an inclination directed downwards starting from the back wall of said inner room, and the front end portion of which is adequately shaped for collecting the greases and the liquids produced during the hot treatment of each food, and terminates near an extractable drawer, in a manner that these substances flowing downwards on to the upper surface of such base plane collect themselves progressively on the shaped and portion and, by passing through one or more slots or small tubes communicating with the extractable drawer, fall down and be collected into the same drawer, so that by extracting this latter they might be disposed of outside, said slots having such geometries as to prevent the microwaves from passing therethrough and to come into contact with the greases and the oils being collected in to the drawer, through the base plane being passing said movement transmission members of the lower heating plate, said inclined base plane being disposed on to and supported by an underlying inclined bottom of said envelope, having the same inclination of that of the base plane and does not performing the same function of collecting the substances like this latter, and being extended itself in the lower part for the entire width of such envelope, and between the base plane and the inclined bottom there being also available either a suitable insulating material of the kind referred to, or there being maintained an empty layer for the passage of the cooling air of the inner room which is hotter.

10. The apparatus according to claim 1, wherein circuits for controlling said heating elements, comprising at least an electric switch connected to the electric supply line and associated to said upper cover, to be switched on when the cover is closed and switched off when the cover is opened, and also comprising at least a timer connected to said electric switch and to a first input of a logic gate AND, said timer being adjustable automatically or manually for changing the switched on time requested from time to time for cooking each food being introduced into said internal room and being enclosed between the upper heating plate and the lower cooking plate, said logic gate AND being provided with an output connected to the electric supply line and interacting with a separate high voltage circuit, supplied by the electric supply line and into which at least a heating element and an electric switch being connected, which latter is actuated manually or automatically in the switched off or on condition thereof, said timer being suitable for switching off said electric switch and switching off said heating element only when the switched on duration of the same heating element is passed, which is set in the timer, with consequent end of the hot treatment step of the food respectively selected.

11. The apparatus according to claim 10, wherein control circuits of said heating elements comprising also at least an electric temperature probe applied to the active heating plate and suitable for detecting the heating temperature of the same plate during each step of food hot treatment, said temperature probe being connected through an electronic amplifier with an electronic comparator of conventional type, at the first input of which a pre-established reference voltage being applied, and at the second input of which said electronic amplifier being connected, and the output of said electronic comparator being connected through an electric conductor with the second input of said logic gate AND, said temperature probe when is detecting the temperatures of the already switched on heating elements being adapted to generate corresponding levels of electric voltage which are applied to the second input of said comparator, through said amplifier, where said levels are compared continuously with the level of the reference voltage of the first input, under the condition in which as long as the level of the electric voltage so generated by the temperature probe is lower than the level of the electric reference voltage of said first input of the same comparator, the temperature of the heating plate is lower or at maximum equal to the heating temperature of the heating plate, for which the food cooking occurs in a regular manner and without dangers of burns or damaging of the food being cooked, and under this condition the electric switch being kept switched on and the heating element steadily switched on, while on the contrary when the level of the electric voltage generated by the temperature probe and applied to said second input is identical to the level of the reference voltage of said first input of the comparator, under the condition in which the heating temperature foreseen into said heating plate has been attained, the output of said comparator assumes a voltage level and therefore the second input of said logic gate AND too assumes the logic state 1, so that the output of such logic gate AND too assumes the same logic state 1, with consequent actuation of the electric switch in the switched off state thereof, and switching off of the heating element, thereby terminating the hot treatment step of the food disposed in the apparatus.

12. The apparatus according to claim 11, wherein control circuits for generating the microwaves, which are constituted by an additional timer connected at one side to a conductor of the electric supply line through an electric conductor, at a position comprised between the switch of said upper cover and said timer, and at the other side they are connected to the other electric conductor of the electric supply line, through a circuit interacting with the control circuitry, known for each magnetron, into which an electric switch is connected for switching on and off manually or automatically such control circuitry, and under this condition by actuating manually or automatically the switch in the switched on state thereof, there are switched on said magnetrons and it is started the hot treatment step of the food of the microwaves generated by the same magnetrons, and the duration of switching on of such magnetrons is set in advance with the timer, so that as long as the switched on duration of such magnetrons has not been passed, the switch remains supplied by the voltage and actuated in the switched on state thereof, with consequent active maintenance of the microwave heating of the food, and on the contrary when the switched on duration pre-established by the magnetrons is terminated, under the condition in which the food has been treated in a correct manner to the pre-established temperature and duration, said switch is actuated in the switched off state thereof thereby switching off the magnetrons and terminating in this way the hot treatment step of the food.

* * * * *